Feb. 2, 1960 — E. W. COUTURE ET AL — 2,923,102
INTERLOCKING DEVICE FOR A SURFACE GRINDING MACHINE
Filed Sept. 20, 1957 — 5 Sheets-Sheet 1

Inventors
Emile W. Couture
Alfred Lees
by Maxwell Fish
Atty.

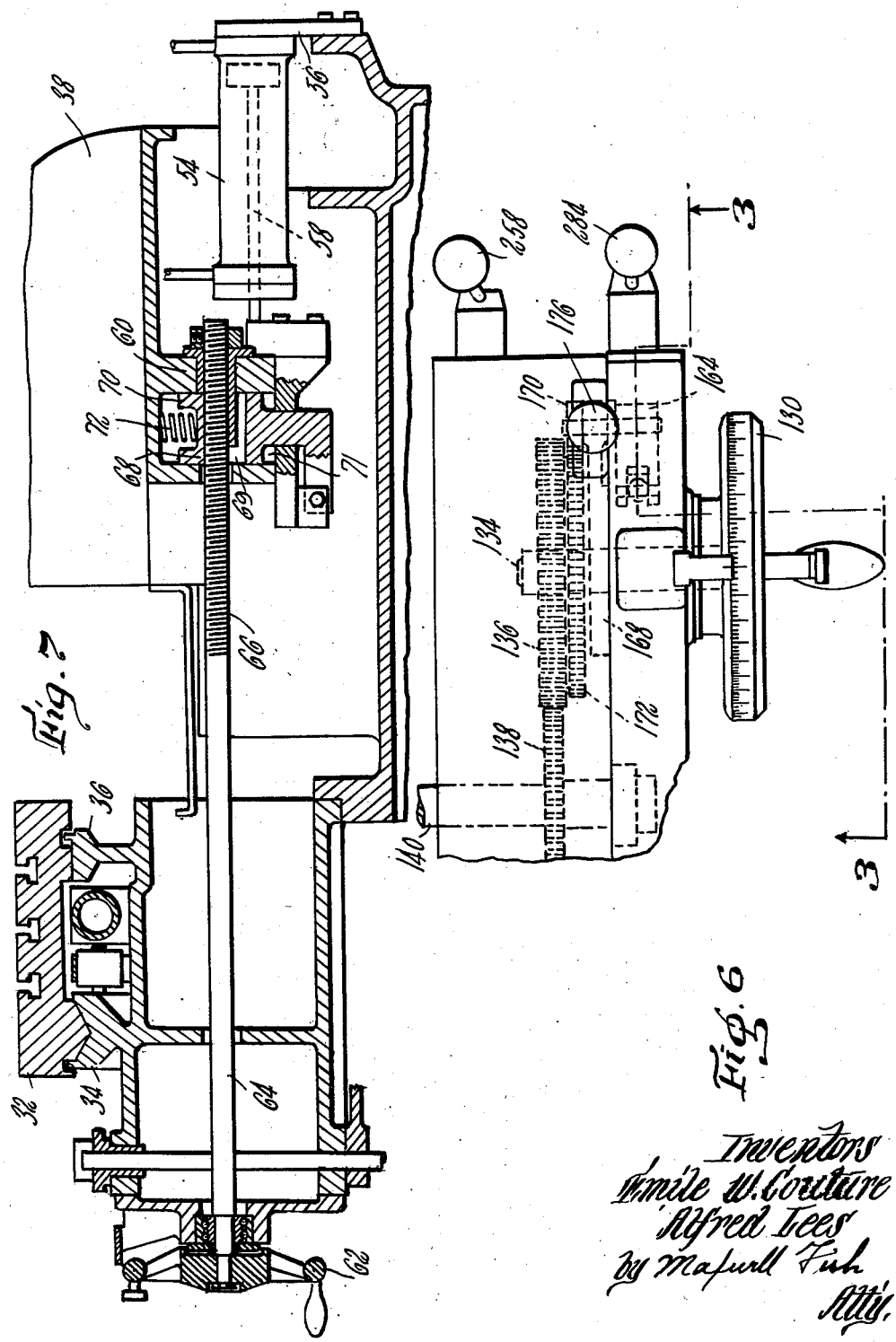

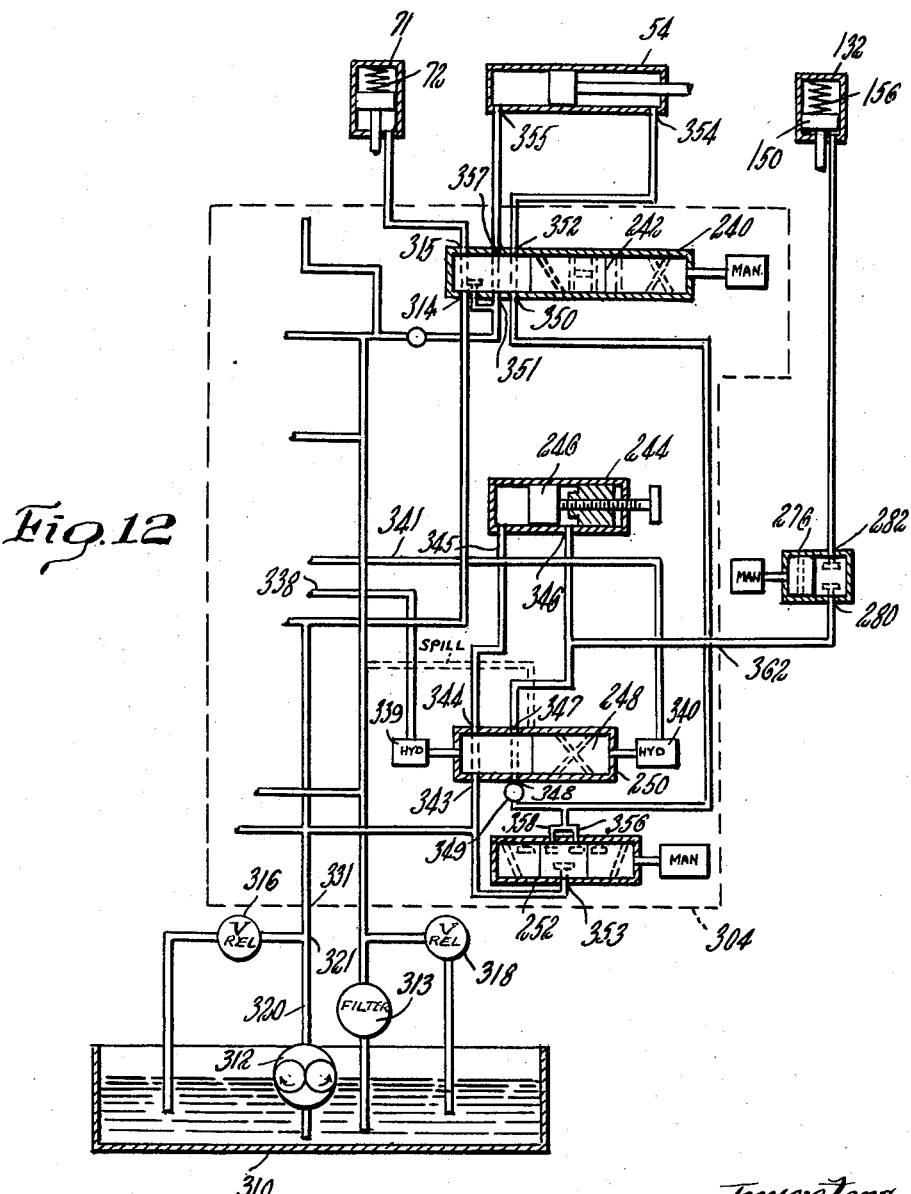

United States Patent Office 2,923,102
Patented Feb. 2, 1960

2,923,102

INTERLOCKING DEVICE FOR A SURFACE GRINDING MACHINE

Emile W. Couture, Barrington, and Alfred Lees, Pawtucket, R.I., assignors to Brown & Sharpe Mfg. Co., Providence, R.I., a corporation of Rhode Island Application September 20, 1957, Serial No. 685,150

3 Claims. (Cl. 51—92)

The present invention relates to a hydraulic operating and control system for use in a grinding machine, and more particularly to an interlocking device connected between manually operable controls for effecting movements of two relatively movable slides of the machine.

The invention, as herein disclosed is embodied in a hydraulically operated surface grinding machine of the general type having a traversing work supporting table, a machine column mounted from the base for cross feeding movements relative to the table, and a grinding wheel carriage movably mounted on the feed column for vertical positioning movements relative to the table.

It is a principal object of the invention to provide in a machine of the general type described having relatively movable slides and alternatively available power and manual feeds for each of said slides, an interlocking device having alternative positions in which the power feed for one or the other slide is locked out of operation, while leaving the manual feed for that slide and both the power and the manual feed for the other slide available.

It is a further object of the invention to provide in a surface grinding machine of the type referred to having hydraulically operated means for effecting stepped cross feeding and vertical downward movements of the column support and the grinding wheel carriage respectively, an interlocking device connected between said hydraulically operated means to permit one only of said hydraulically operated means to function at one time.

More specifically it is an object of the invention to provide an interlocking device which is connected between a power feed control by means of which relative cross feeding movements of the table and grinding wheel are effected, and a second power feed control by means of which relative vertical positioning movements of the table and the grinding wheel are effected, said interlocking device being shiftable alternatively to lock either one of said power feed controls out of operation, while leaving the other of said power feed controls available for active operation, and at the same time leaving the controls for effecting manual operation of each of said cross feed and vertical feeds available.

With the above and other objects in view as may hereinafter appear the several features of the invention consist in the devices, combinations and arrangement of parts hereinafter described and claimed which, together with the advantages to be obtained thereby, will be readily understood by one skilled in the art from the following description taken in connection with the accompanying drawings in which:

Fig. 6 is a top plan view of substantially the parts shown in Fig. 3;

Fig. 7 is a sectional view taken on a line 7—7 of Fig. 2;

Fig. 12 is a diagram of the hydraulic controls for effecting operation of the reverse cross feed and the vertical down feed for the machine.

Figure 1:
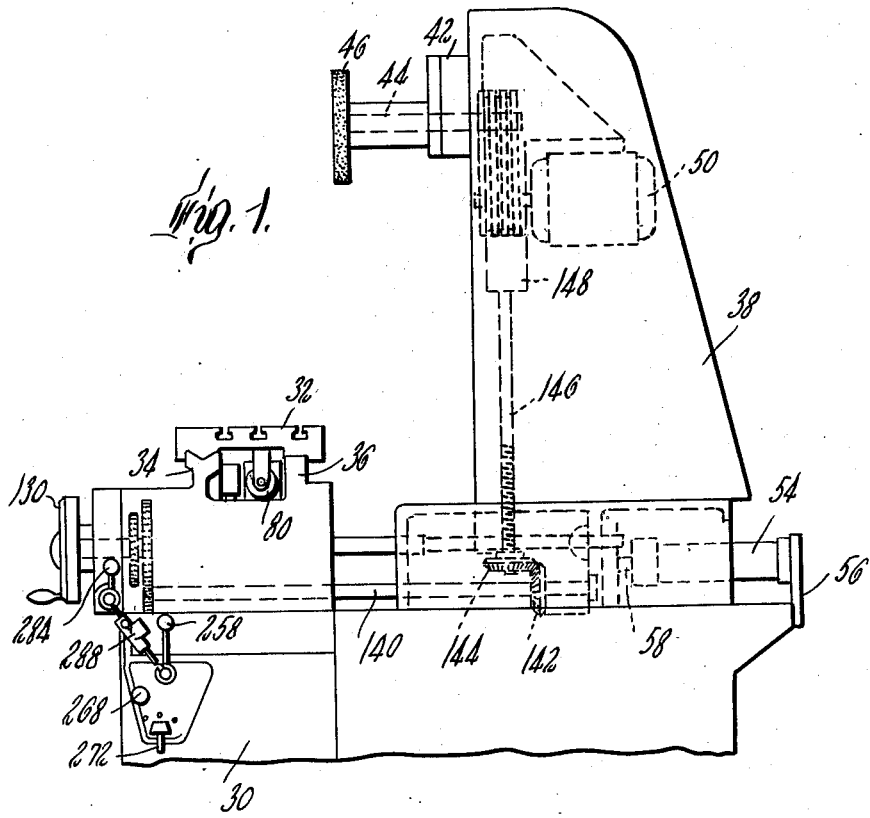
Fig. 1 is a view in right side elevation of a surface grinding machine embodying in a preferred form the several features of the invention.

The invention is herein disclosed as embodied in a surface grinding machine of the general type having a base 30, a table 32 adapted for traversing movement on ways 34, 36 on the base, a cross slide which takes the form of a machine column 38 which is mounted on ways on the base 30 for forward and back movement with relation to the table, and a grinding wheel carriage 42 which is adapted for vertical movement on ways formed on the machine column 38.

The carriage 42 provides support for a forwardly extending arbor 44 on which is mounted a grinding wheel 46. The arbor 44 at its rear end is connected by a pulley drive 48 with an electric motor 50, also mounted on the carriage 42.

Cross feeding movements of the column support 38 and grinding wheel 46 supported thereby are effected alternatively by a hydraulically operated means and by hand-operated mechanical means. For hydraulic cross feeding operation of the column support 38 a hydraulic cylinder 54 is provided as best shown in Figs. 1 and 7 secured at its rear end to a vertically extending bracket 56 mounted from the base and provided with a piston 58 which is connected to a downwardly extending bracket 60 formed on the underside of the column support 38. Cross feeding movements are imparted to the column support 38 by means of a handwheel 62 secured to the forward end of a rotatable shaft 64 (see Fig. 7) mounted in the base and which toward its rear end is formed with a screw thread 66 adapted for engagement with a half-nut 68 formed in a recess 69 cut through the vertically shiftable plunger 70 of a cross feed nut throwout hydraulic cylinder 71 which forms an integral part of the column support 38.

The plunger 70 and half-nut 68 are normally held in a depressed screw thread engaging position as shown in Fig. 7 by means of a compression spring 72 mounted between a recess in the upper end of the plunger 70 and a recess formed in the bracket 60. During operation of the cross slide by hydraulic means, the plunger 70 is moved upwardly against the pressure of the spring 72 to disengage the half-nut 68 from the screw thread 66.

Figure 2:
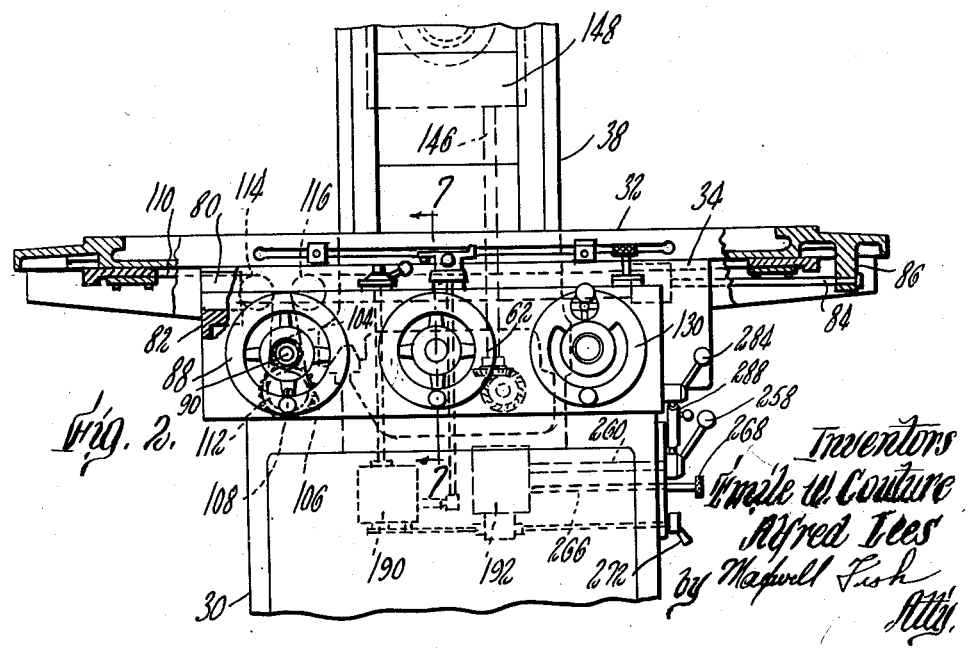
Fig. 2 is a view in front elevation of the grinding machine shown in Fig. 1 with the grinding wheel carriage and upper part of the column removed.

As best shown in Figs. 1 and 2 inclusive the table 32 is operated by hydraulic means or alternatively through mechanical connections including a manually operated handwheel at the front of the machine. For hydraulically operating the table a table cylinder 80 is provided which is connected at the left as shown in Fig. 2 to a bracket 82 on the base, the associated piston 84 being secured to a depending bracket 86 secured to the right hand end of the table.

Connections for manually operating the table include a table handwheel 88 which is secured to a rotatable shaft 90 which is connected through intervening connections to a pinion 104 which meshes with a large gear 106 on a short shaft 108 mounted on the base. Motion is transmitted to the table 32 from the shaft 108 by means of a strap 110 which passes around a pulley 112 on the shaft 108 and thence upwardly around two pulleys 114, 116 mounted on the base directly beneath the table. One end of the strap passing around the pulley 114 is secured to the table 32 toward the left hand end of the table, and the other end of the strap 110 passing around the pulley 116 is secured to the table 32 at its right hand end as best shown in Fig. 2.

The vertical feed for the grinding wheel carriage as best shown in Figs. 1, 2, 3 and 6 is effected alternatively through mechanical connections actuated by a vertical feed handwheel 130 and by hydraulically operated devices including a vertical feed cylinder 132 which operates through a pick mechanism hereinafter described to effect a stepped vertical feeding movement of the carriage. Handwheel 130 is mounted on the forward end of a rotatable vertical feed handwheel shaft 134 which carries at its rear end a large pinion 136 adapted to mesh with a pinion 138 on a parallel shaft 140 (see Fig. 6).

Figure 3:
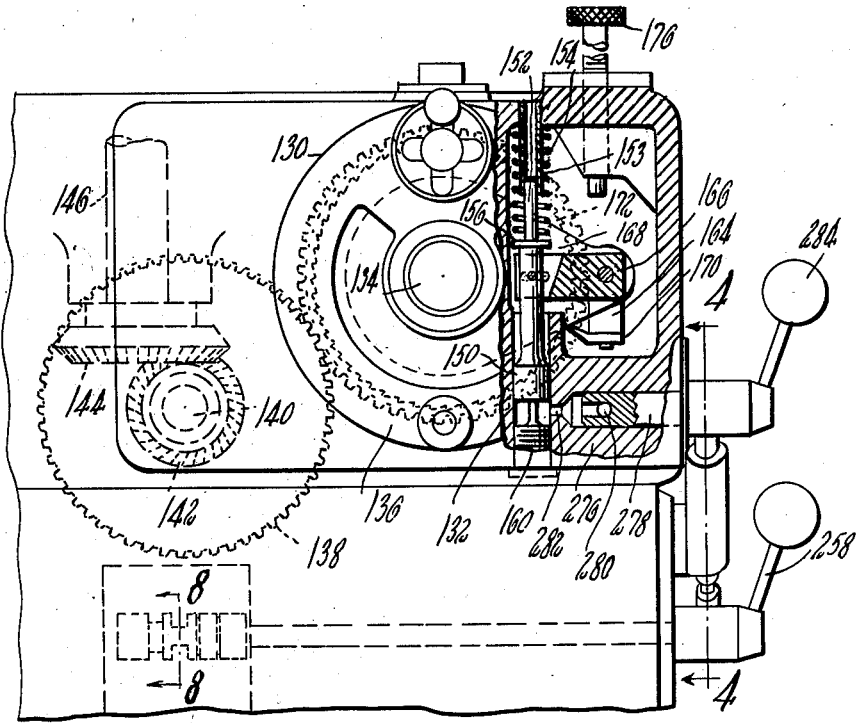
Fig. 3 is an enlarged detail view in front elevation of the vertical feed hand wheel and driving connections for imparting vertical movements to the grinding wheel carriage.

As best shown in Figs. 1 and 3 a bevel gear 142 mounted on the shaft 140 meshes with a bevel gear 144 secured to the lower end of a vertical grinding wheel carriage feed screw shaft 146 which is threaded to receive a nut 148 fixed to the carriage 42.

The hydraulic mechanism provided for effecting a power down stepped feeding movement of the grinding wheel carriage comprises a hydraulic cylinder 132, which, as best shown in Fig. 3, is provided with a vertically disposed plunger 150 and an upwardly extending stem portion 152 which engages within a sleeve bearing member 153 secured to the machine frame. A compression spring 154 coiled about the stem 152 and the sleeve bearing member 153 and seated at its lower end against a collar 156 on the stem 152 and at its upper end against an abutting shoulder of the machine frame, acts to force the plunger yieldably downwardly to its fully retracted position as shown in Fig. 3 which is determined by adjustment of a stop member 160 screw threaded into the lower end of the hydraulic cylinder 132. An upward movement of the plunger 150 of the hydraulic cylinder 132 acts through a pick mechanism to impart a stepped vertical movement to the grinding wheel carriage 42.

The pick mechanism referred to comprises an L-shaped pawl lever 164 pivoted at 166 on a pawl supporting arm or bracket 168 loosely supported to turn on the vertical handwheel supporting shaft 134. A horizontal arm on the pawl lever 164 has a pin and slot connection with the upward extension 152 of the hydraulic cylinder plunger 150. The downward extension of the pawl lever 164 carries a pawl 170 which is arranged to engage with a ratchet wheel 172 secured to the front face of the gear 136 on the shaft 134. Upward movement of the plunger 150 of the vertical feed cylinder 132 first causes the pawl lever 164 to rock in a clockwise direction from the position shown in Fig. 3 to engage the pawl 170 with the ratchet 172 and thereafter causes the pawl 170, the pawl lever 164 and the bracket 168 to be rotated as a unit counterclockwise about the shaft 134 and to rotate the ratchet 172, shaft 134 and gear 136 in said counterclockwise direction.

The length of each individual feeding movement of the pick mechanism is determined by means of knurl-headed adjusting screw 176 which is adjustably positioned to engage with and arrest the upward movement of the bracket 168 and associated parts including the pawl lever 164 and the ratchet 172 actuated thereby.

The hydraulic devices by means of which fluid under pressure is supplied to each of the operating hydraulic cylinders of the machine include two valve blocks, indicated generally at 190 and 192 in Fig. 2 which house respectively the several table operating valves and the valves by means of which the cross feeding movement of the slidable column support 38 is controlled. Inasmuch as the operation of the table including the table operating valves form specifically no part of the present invention, no specific illustration or description of these parts is included herewith.

The cross feed valve assembly housed in block 92 includes a cross feed reversing selector valve 240 having a rotatably shiftable valve body 242, a cross fed measuring valve 244 having an axially shiftable valve body 246, a cross feed control valve 248 having an axially shiftable valve body 250 and a truing and rapid positioning selector valve 252 having a rotatable valve body 254.

Figure 9:
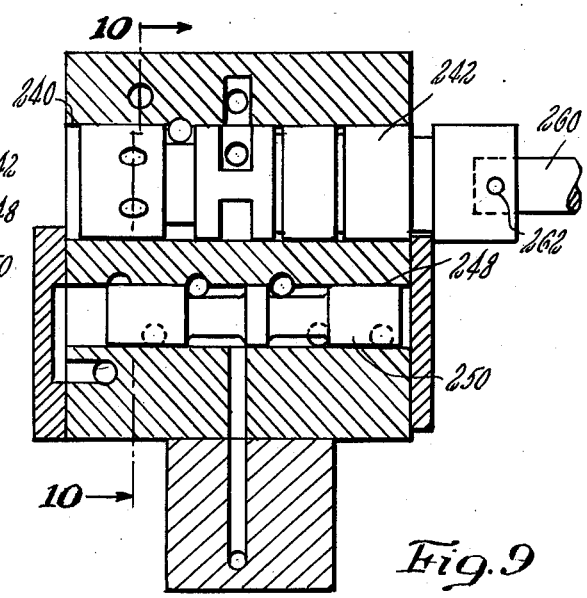
Fig. 9 is a sectional view taken on line 9—9 of Fig. 8 illustrating particularly the cross feed reversing selector valve and the cross feed control valve.
Figure 10:
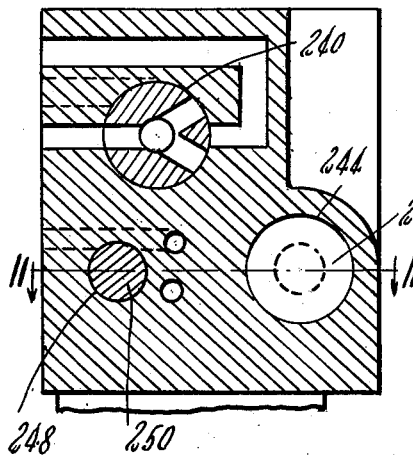
Fig. 10 is a sectional view taken on a line 10—10 of Fig. 9 illustrating particularly the cross feed reversing selector valve and the cross feed measuring valve.
Figure 11:
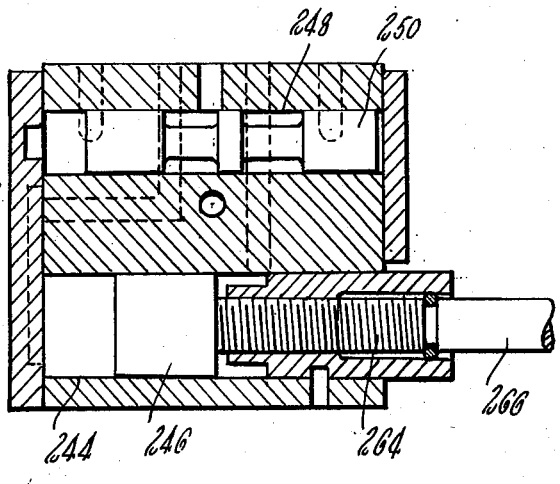
Fig. 11 is a sectional view taken on a line 11—11 of Fig. 10 illustrating particularly the cross feed control and the cross feed measuring device.

Manual controls for the several valves of the cross feed valve assembly include a cross feed reversing hand lever 258 (see Figs. 2, 4 and 5) which is secured to a rock shaft 260 (see Fig. 9) secured by a pin 262 to the valve body 242 of the cross feed reversing selector valve 240. The amount of the cross feeding movement imparted to the column support 38 by the operation of the cross feed measuring valve is determined by means of an adjusting screw 264 (see Fig. 11) which is provided with an extension 266 extending through the side wall of the machine and with a knurled head 268. Adjustment of the screw 264 determines the length of travel of the valve body 246 and thus provides a metered supply of fluid under pressure to the cross feed hydraulic cylinder 54. A manual control is provided at the side of the machine for positioning the truing and rapid positioning selector valve in the form of a hand lever 272 having three alternative true, grind and fast operating positions.

The power down feed hydraulic cylinder 132, as best shown in Figs. 3 and 12, is controlled by means of a down feed selector valve 276 provided with a rotatable valve body 278. An inlet port to the valve is provided at 280 and an outlet port from the valve to the down feed cylinder 132 is indicated at 282. The position of the down feed selector valve body 278 is controlled by means of a down feed selector lever 284 which is shiftable between operating and Off positions.

In accordance with the invention an interlocking device having two alternate locking positions is connected between the down feed selector lever 284 and the cross feed reversing hand lever 258, and is so constructed and arranged that, when the interlocking device is moved to one position, the cross feed is locked out of operation before the vertical power down feed lever can be turned to the operating position, and when the interlocking device is moved to the alternate position, the down feed lever 284 is locked in the Off position before the cross feed selector lever can be turned to the operating position. As hereinafter more fully pointed out in connection with the hydraulic diagram, Fig. 12, the manual and power controls for the vertical feed and for the cross feed are so arranged that when the power cross feed is locked out of operation both the manual and power vertical feed are available to the operator and also the manual cross feed. In the alternate position of the interlocking device when the power vertical feed is locked out of operation, both the manual and power cross feed and also the manual vertical feed are available to the operator.

Figure 4:
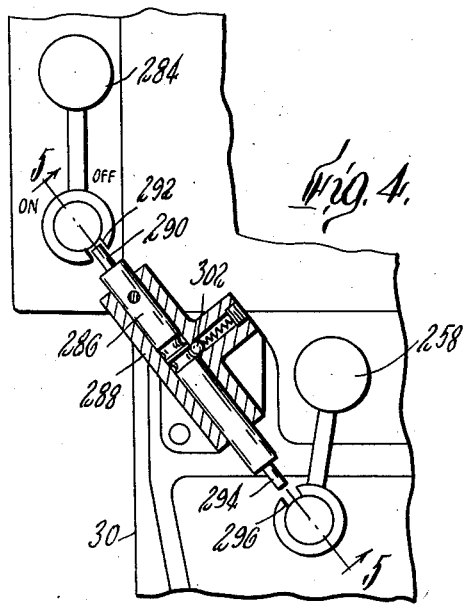
Fig. 4 is a detail sectional view taken on a line 4—4 of Fig. 3 on an enlarged scale to illustrate particularly the interlocking device between the manual controls for the power cross feed and power vertical down feed.
Figure 5:
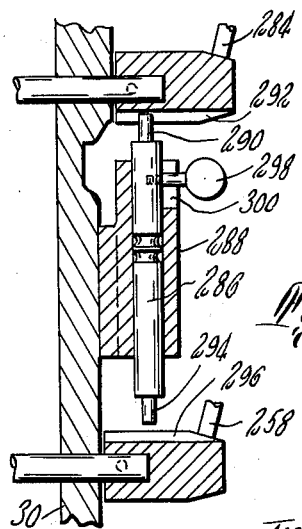
Fig. 5 is a detail sectional view taken on a line 5—5 of Fig. 4.
Figure 8:
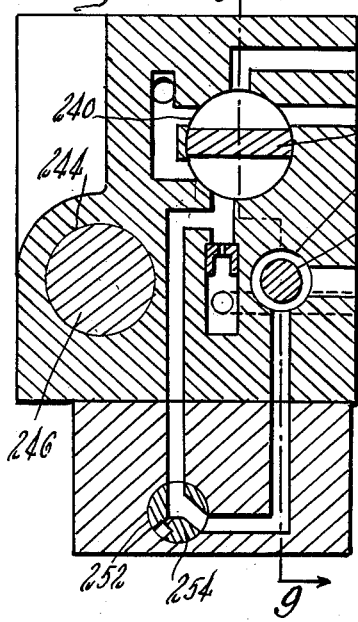
Fig. 8 is a vertical sectional view taken on a line 8—8 of Fig. 3 of the cross feed valve assembly illustrating particularly the cross feed reversing selector valve, the cross feed control valve and the truing and rapid positioning selector valve.

The interlocking device which is best shown in Figs. 4 and 5 comprises a plunger 286 which is mounted to slide in a generally tubular bracket 288 secured to an external end surface of the base 30 of the machine. One end of the plunger 286 is turned down to provide a pin 290 which is adapted to engage with a slot 292 formed in the hub of the down feed selector lever 284. At its other end the plunger is similarly turned down to provide a pin 294 which is arranged for engagement with a slot 296 formed in the hub of the cross feed reversing hand lever 258. The arrangement is such that the movement of the plunger and pins out of locking engagement with one control lever causes the other pin to move simultaneously into locking engagement with the other lever. A small hand actuated knob 298 having a stem which is secured to the plunger 286 and projects outwardly through a slot 300 in the tubular casing 288 provides a convenient means to move the plunger from one to the other locking position. A spring pressed ball 302 mounted in a transverse bore formed in the casing 288 is arranged for engagement alternatively with either of two circular grooves formed in the plunger 286 to hold the plunger yieldably in either of its locking positions.

The operation of the hydraulic operating and control system for effecting cross feeding movements of the column support 38 and vertical feeding movement of the grinding wheel carriage 42 will be particularly described in connection with the diagram Fig. 12, so much only, however, of the hydraulic operating and control system together with its operation being described as is believed necessary to indicate the connection of the present invention therewith.

For convenience of illustration in Fig. 12 the two valve blocks 190 and 192 indicated in Fig. 1 are considered to be a single panel designated in Fig. 12 at 304. Other elements of the hydraulic system so far as disclosed in Fig. 12 include an oil reservoir 310, an oil pump 312, an oil filter 313 in the oil return system to the reservoir, a high pressure relief valve 316 in a branch return line in the pressure line from the pump 312, and a low pressure relief valve 318 located in a branch return line to the reservoir.

The illustrated machine is set up to provide for an increment of cross feeding with each table reversal. Oil at high pressure is supplied at one table reversal through a conduit 338 to the cross feed control valve port 339. The cross feed control valve body 250 shifts axially and the oil in the other feed control valve port 340 is exhausted through a conduit 341. For effecting an increment of cross feed movement at the other table reversal, oil under pressure is supplied through conduit 341 to the cross feed control valve port 340 causing the cross feed control valve body 250 to shift axially to the left while at the same time oil is exhausted at low pressure through the conduit 338.

Any excess of oil which cannot be accommodated by the cross feed control valve body 250 is dumped into low pressure through ports marked "Spill" on the diagram, Fig. 12.

Assuming that cross feed is required at each table reversal, high pressure oil will be available to the cross feed control valve 248 through a port 331 into the panel 304 from the pump 312, and thence passing through port 343 into the cross feed control valve 248. High pressure oil flows from the port 343 to port 344 and then to port 345 of the measuring valve 244. The measuring valve body 246 moves through an adjustable stroke under the action of high pressure oil, and a measured amount of oil leaves port 346 and goes to ports 347 and 348 of the cross feed control valve 248. The oil then goes through orifice 349 which controls the speed at which the cross feed occurs and then to port 350 of the cross feed selector valve 240. If the selector valve is in the middle or neutral position, the oil from the measuring valve is dumped into low pressure at port 351. In the neutral position the cross feed nut throw-out cylinder 71 is connected to low pressure through ports 315, 314. This connects the handwheel 62 and screw 66 to the cross feed cylinder 54 and the slide can be moved by hand.

The cross feed reversing selector valve 240 can be turned so that oil from the measuring valve is directed into the cross feed cylinder 54, and the column support 38 will move either in or out a measured amount with each table reversal. For example, if the cross feed reversing selector valve 240 is turned to give cross feed In, the oil from the measuring valve 244 goes through the conduits 350, 352, 354 and moves the column support. Oil from the back side of the cross feed cylinder 54 goes through ports 355, 357 and 351 and then into low pressure. When the cross feed reversing selector valve 240 is shifted to give either an In or Out cross feed, high pressure oil is connected to the cross feed nut throw-out cylinder 71, and the cross feed handwheel 62 and screw 66 are disconnected from the cylinder 54.

When either rapid positioning or a truing cross movement of the column support 38 is required, the truing and rapid positioning selector lever 272 is turned from its neutral position. Oil under high pressure is supplied from the pump 312 to the truing and rapid positioning selector valve 252 through ports 320, 321, 331 and 353. The oil goes from port 353 to a port 358 if the valve is set for rapid positioning, and from port 353 to a port 356 if the valve is set for truing. Port 356 has a fixed orifice which gives the required truing speed.

If the cross feed selector valve body 242 is in the neutral position, oil passing through the truing and rapid positioning selector valve 252 is dumped into low pressure. If the cross feed reversing selector valve body 242 is set for either In or Out, oil at high pressure from the truing and rapid positioning selector valve is directed into the cross feed cylinder 54.

The down feed cylinder 132, as above described in connection with Figs. 3 and 12, is controlled by means of the down feed selector valve 276 and the manually operable down feed selector lever 284 which is shiftable between operating and Off positions. It will be understood in connection with the following description of the operation of the power down feed that the interlocking device comprising the plunger 286 and its manual control knob 298 have been shifted to lock the cross feed reverse selector valve 240 and its manual control lever 258 in the neutral or inoperative position. Under these conditions the line 348, 349, 350 between the cross feed control valve 248 and the cross feed reverse selector valve 240 remains at low pressure so that the power cross feed is rendered inoperative, although the cross feed piston 58 being connected at both sides to low pressure may be moved in either direction by means of the manual cross feed wheel 62. Although the cross feed reverse selector valve 240 is locked in its neutral position, the measuring valve 244 will continue to be shifted from one to the other position with each reversal of the table travel as oil under high pressure is alternately supplied to conduit 358 and to conduit 341 and is at the same time exhausted at low pressure from the other of said conduits. As previously noted, the line 344, 345 is supplied with oil at high pressure while oil is being exhausted at low pressure through the line 346, 347 during the travel of the table in one direction, and oil at high pressure will be supplied through the line 346, 347 and will be exhausted at low pressure through the line 345, 344 during the table travel in the opposite direction. It is now assumed that the down feed control valve 276 has been turned to the On position. Each time the line 346, 347 between the cross feed control valve 248 and the cross feed measuring valve 244 is supplied with oil at high pressure, this high pressure oil is forced through a connecting port 362 from the panel, through the down feed control valve 276 at port 280, and thence through port 282 to the down feed cylinder 132, thus actuating the down feed cylinder piston 150 to impart a stepped down feeding movement to the grinding wheel carriage 42. As previously noted the power down feed is effected through the operation of the hydraulic cylinder 132 and its spring actuated return valve body 150 which operates through a pick mechanism to impart a stepped downward feeding movement to the grinding wheel carriage 42.

Upon the next table reversal when as above pointed out, the oil is exhausted through line 346, 347 at low pressure, the spring 156 returns the down feed valve body again at low pressure now prevailing in the connections to the down feed cylinder 132.

The invention having been described what is claimed is:

1. In a surface grinding machine having a base, a traversing work supporting table, a column slidably mounted from the base for cross feeding movement relative to the table, and a grinding wheel carriage slidably mounted on the machine column for vertical positioning movement relative to the table, a fluid pressure operating and control system for the machine including a fluid pressure operated cross feed cylinder connected between the base and the column, a manually operable screw and nut mechanism for effecting cross feeding movement of the column including a fluid pressure operated nut throw-out cylinder, a vertical feed mechanism including a manual actuator for effecting vertical movement of said grinding wheel carriage on the column, a power operated down feeding device for the grinding wheel carriage including a pick device for actuating said vertical feed mechanism and a fluid pressure actuated down feed cylinder connected with said pick mechanism for effecting stepped downward movements of the grinding wheel carriage, fluid pressure connections to each of said cylinders including a cross feed reversing selector valve having alternative reverse and neutral positions, a fluid pressure actuated connection between said cross feed selector valve and the cross feed nut throw-out cylinder operative for each reverse position of said cross feed reversing selector valve and inoperative for the intermediate neutral position of said cross feed selector reversing valve to disconnect said screw and nut, a down feed selector valve in said fluid pressure connections to the down feed motor having alternative operating and neutral positions, and an interlocking device between said cross feed selector valve and said down feed selector valve shiftable between alternative positions in which an alternate one of said valves is locked in the neutral position.

2. In a surface grinding machine having a base, a traversing work supporting table, a column slidably mounted from the base for cross feeding movements relative to the table, and a grinding wheel carriage slidably mounted on the machine column for vertical positioning movement relative to the table, the combination of a fluid pressure operating and control system for the machine including a fluid pressure operated cross feed cylinder connected between the base and the column, a vertical feed mechanism for effecting vertical movement of the grinding wheel carriage on the column, a power operated down feeding device for the grinding wheel carriage including a fluid pressure actuated down feed cylinder connected with said vertical feed mechanism, fluid pressure connections to each of said cylinders including a cross feed reversing selector valve having alternative operating and neutral positions, and a down feed selector valve having alternative operating and neutral positions, means under the control of the operator for shifting each of said selector valves between said operating and neutral positions, and an interlocking device between said cross feeding selector valve and said down feed selector valve constructed and arranged for movement between alternative positions in which an alternate one of said valves is locked in the neutral position.

3. A surface grinding machine according to claim 2 in which a manual controller is connected with the cross feed selector valve for movement between alternative operating and neutral positions to shift said valve from one to another of said alternate operating and intermediate neutral positions, a manual controller connected with said down feed selector valve shiftable between alternative operating and neutral positions to move said down feed selector valve between alternative operating and neutral positions, and an interlocking device shiftable between one position in which said interlocking device engages and locks said cross feed selector valve manual controller in the neutral position, and a second position in which said interlocking device engages with and locks said down feed selector valve manual controller in the neutral position, said interlocking device and each of said manual controllers having locking surfaces adapted for the neutral position of each of said manual controllers to permit movement of the interlocking device into locking engagement therewith.

References Cited in the file of this patent

UNITED STATES PATENTS

| | | |
|---|---|---|
| 2,284,073 | Silven | May 26, 1942 |
| 2,292,588 | Terbrueggen | Aug. 11, 1942 |